United States Patent [19]

Soumekh

[11] Patent Number: 5,170,170
[45] Date of Patent: Dec. 8, 1992

[54] RADIATION IMAGING UTILIZING DATA RECONSTRUCTION TO PROVIDE TRANSFORMS WHICH ACCURATELY REFLECT WAVE PROPAGATION CHARACTERISTICS

[75] Inventor: Mehrdad Soumekh, Snyder, N.Y.

[73] Assignee: State University of New York, Albany, N.Y.

[21] Appl. No.: 744,603

[22] Filed: Aug. 13, 1991

Related U.S. Application Data

[63] Continuation of Ser. No. 473,895, Feb. 2, 1990, abandoned.

[51] Int. Cl.$^5$ .................. G01J 13/89; G01J 15/89; A61B 8/15; G01N 29/06
[52] U.S. Cl. .................. 342/179; 342/25; 367/7; 73/603; 128/660.07
[58] Field of Search .............. 342/179; 367/7; 73/603; 128/660.07, 661.01, 661.02

[56] References Cited

U.S. PATENT DOCUMENTS

| | | | |
|---|---|---|---|
| 3,805,596 | 4/1974 | Klahr | 367/7 X |
| 3,885,224 | 5/1975 | Klahr | 342/179 X |
| 3,953,822 | 4/1976 | Vilkomerson | 342/179 X |

Primary Examiner—Gilberto Barron, Jr.
Attorney, Agent, or Firm—Martin Lukacher

[57] ABSTRACT

A system for radiation imaging of an object in response to echo signals from a target area of the object, such as a region of the anatomy of a body. Data is obtained by time domain measurements at monostatic transducers which can be disposed in different locations. The data is processed by two-dimensional Fourier transformations reconstructed using a mapping function and which compensates for variation in the radiation pattern at the various detector locations by using a phase correction function which avoids the need for Fresnel or plane wave approximations.

5 Claims, 4 Drawing Sheets

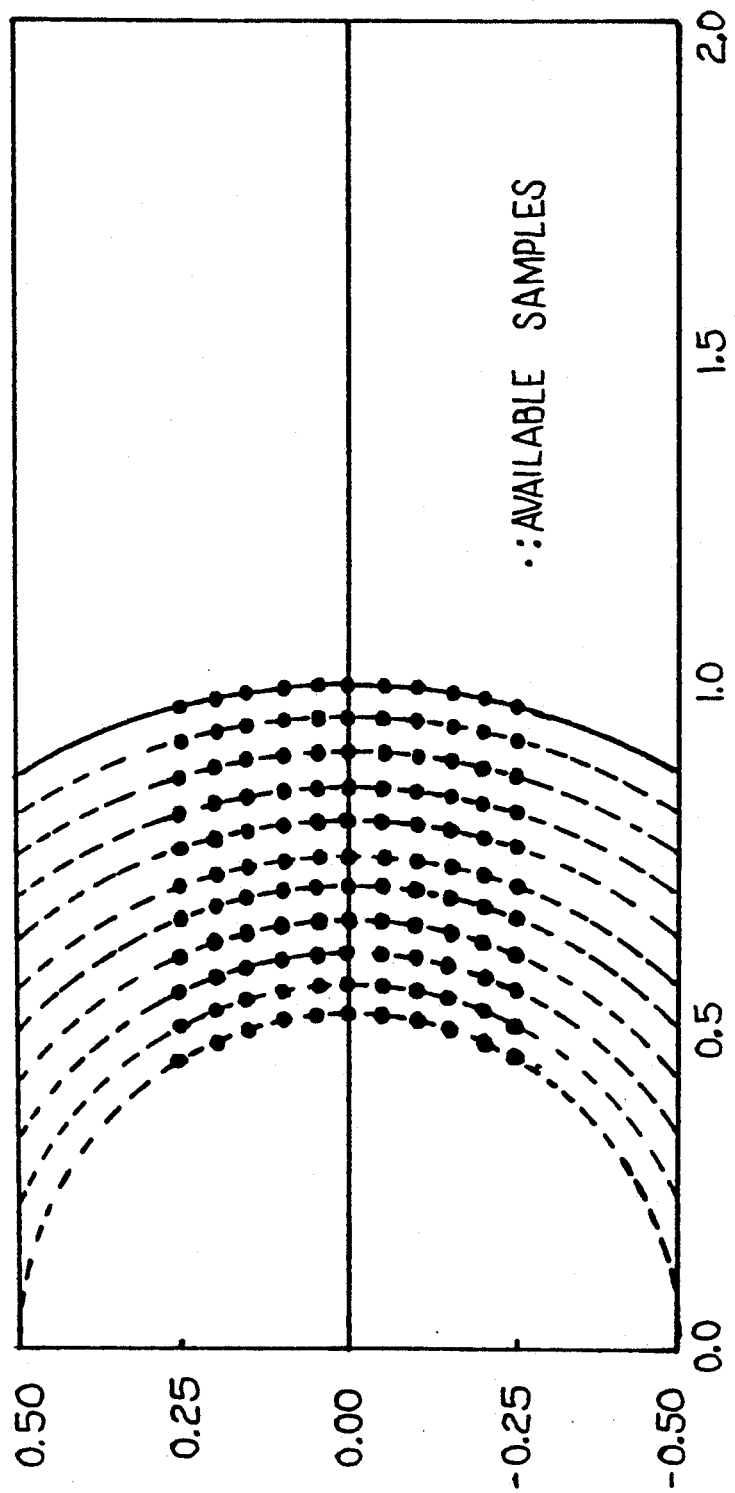

5,170,170

RADIATION IMAGING UTILIZING DATA RECONSTRUCTION TO PROVIDE TRANSFORMS WHICH ACCURATELY REFLECT WAVE PROPAGATION CHARACTERISTICS

DESCRIPTION

This application is a continuation of my application Ser. No. 473,895 filed Feb. 2, 1990 (now abandoned).

FIELD OF THE INVENTION

This invention relates to radiation imaging wherein the radiation is electromagnetic radiation or sonic radiation (ie., acoustic or ultrasonic radiation) and especially where the imaging is echo imaging, i.e., where radiation is directed toward an object and reflected radiation is received and analyzed to create an image, and more particularly to an improved system for processing echo signals using transforms and conversions which provide data from which accurate images of a target region (also called an object area) can be obtained.

BACKGROUND AND APPLICATIONS FOR THE INVENTION

Imaging systems using spatial frequency transforms to process echo signals from real and synthetic aperture are now well-known in the art. Systems for processing data from such arrays have been described in publications such a C. N. Klahr, U.S. Pat. No. 3,805,224 issued May 20, 1979 and G. W. Adams et al., U.S. Pat. No. 4,717,916, issued Jan. 5, 1988.

While synthetic aperture arrays have been used, e.g., in certain radar systems, however, resolution has not been as high as desired due in part to errors introduced in computerized algorithms used to process the radiation data (from the echo signals) which is collected into a form for display.

Currently, stationary B-scanners are used, which are inserted into the body through the esophagus or colon, for chest cavity and pelvic cavity imaging, respectively. A B-scanner's resolution, however, is limited by its aperture size. A large B-scanner can be inserted into the body via the throat, but the procedure presents patient risk. Moreover, the depth of insertion into the colon for a large B-scanner is very limited. Imaging systems using small scanners which can readily be inserted into the body channels, such as via the esophagus, which allow high resolution with low patient risk are facilitated by this invention.

Acoustical imaging is a viable tool for examining ocean floors where optical images are not practical. Acoustic sources mounted on mobile robots or boats have been used for this purpose. Similar imaging geometrics also arise in geophysical exploration with a mobile transducer. This invention is useful to provide higher resolution imaging in such acoustical imaging applications even with small aperture arrays.

Synthetic aperture echo imaging has become viable for radar application, when the array's aperture is much smaller than the object's range. Complex computer processors have attempted to use background signals to synthesize the effect of a large aperture antenna. In a similar fashion, Inverse Synthetic Aperture Radar (ISAR) imaging utilizes the motion of the object to synthesize a large aperture system.

The far field radiation pattern of a radar resembles a spherical wave. The existing SAR/ISAR inverse methods are based on approximations for the spherical radiation pattern of the radar, e.g., the Fresnel approximation (stripmap-mode SAR), or the plane wave approximation (spotlight-mode SAR; ISAR imaging of a rotating object). These methods fail to provide accurate image data for high-resolution radar imaging (small wavelength and larger synthetic aperture) of a large object area. In synthetic aperture echo imaging problems of diagnostic medicine, sonar and geophysical exploration, the Fresnel approximation-based and the plane wave approximation-based methods can result in severely degraded and erroneous (scrambled) images of the object's (target) reflectivity function. The cross-range resolution can be improved when the temporal frequency of the radar's signal is increased. However, the phase error introduced in approximating a spherical wave by a plane wave is also an increasing function of the temporal frequency. Moreover, the inversion methods for reconstructing from an arbitrary set of straight line integrals are not applicable for reconstructing from line integrals over arbitrary curves, such as circular paths that arise in synthetic aperture echo imaging.

FEATURES AND SUMMARY OF THE INVENTION

It is a feature of the invention to provide a system which obtains accurate and high resolution images from echo signals from a target region received at a synthetic aperture array and then reconstructs two-dimensional Fourier transform data corresponding to the signal data such that when said Fourier transform data is converted into spatial data, high resolution, accurate images of the target region can be obtained.

It is another feature of the invention to provide an echo signal processor, especially one which provides a synthetic aperture emitter/detector, which is especially useful in diagnostic medicine, for imaging as target regions, portions of human anatomy that are partially enclosed in boy structure, which processor transforms the detected signals into signals from which accurate displays of the target region are obtained.

It has been discovered in accordance with the invention that reconstructing the echo signal data which has previously been subjected to a two-dimensional fourier transform by means of a phase function on spatial frequency data ($k_u$) for each discrete frequency ($\omega$, the frequency in radians/sec) of the transform, spherical wave propagation can be incorporated to improve the resolution of synthetic aperture array data, even with arrays in which the target to transducer range is small as compared to the aperture, or the transducer (emitter-detector), such as where the transducer is used in the esophagus or colon. The phase function is, where the distance from the transducer to the anatomy of interest is very limited and where Fresnel and plane wave propagation approximations are subject to error expressed as follows $$\exp[j2k\sqrt{(X_1-x)^2+(Y_1+u_i-y)^2}\,]$$

where $k=w/c$ is the wavenumber, c is the velocity of propagation in the medium surrounding the target, $(X_1, Y_1+u_i)$, $i=1,\ldots N$ are the coordinates of the i-th transmitting/receiving element (the transducers); $u_i$ takes on values in $[-L, L]$ a vertical line in the y direction along which the element is disposed at position $u_i$, $i=1,\ldots N$ (synthesized aperture); $(X_1, Y_1)$ are the coordinates of the element at the center of the synthetic array (midpoint on the vertical line); the target is centered around the origin; i.e., (0,0); $\sqrt{(X_1-x)^2+(Y_1+u_i-y)^2}$ is the distance from a reflector at the coordinates (x,y) in the target region to the element located at $(X_1, Y_1+u_i)$.

The invention, as in the prior art mentioned above, operates by detecting radiation (echo signals) from the object at a plurality of spaced apart locations to provide echo signal data and transforms that data to obtain information which can be plotted to create an image of the object. The invention, by the reconstruction of the data in the frequency and spatial frequency domains, provides data which, when transformed into the spatial two-dimensional ($K_x$; $K_y$) domain, creates information which when inversely transformed can be plotted to provide an accurate high resolution image even where the range is very small and without assumptions as to signal propagation such as Fresnel or plane wave approximations.

More specifically, radiation reflected or emitted from the object is received. The receipt occurs at a plurality of locations relative to the object by a physical or synthetic aperture. The radiation data is transformed into time domain and aperture domain data and processed by two-dimensional fourier transform. The time domain as used herein means the time delay domain from the object to a transducer and the aperture domain means the relative spatial relationships of transducer locations when receiving radiation (t below for time and $u_1$ to $u_n$ for detector location).

In computations for three dimensional imaging, the same system may be used except that there are two sets of dimensional spacings of locations in the array (aperture domain) where data is received; the third set being time. The two dimensionals in such an array may be linear or rotational. In three dimensional imaging, three dimensional Fourier transforms are used. The system provided by the invention is operative with a group of SETs (single element or monostatic transducer) with arbitrary radiation patterns. Linear processing of the available radiation patterns is first used in the system of the invention, as discussed in detail hereinafter to synthesize the returns due to a limited number of plane waves from a given point object in space.

In accordance with the invention, a synthetic aperture echo imaging inverse method has been developed using a SET based on a source/object interaction system model that incorporates the spherical nature of the SET's radiation pattern via the reconstruction of the spatial frequency data discussed above. The inverse method involves processing of the detected signals, at various coordinates of an array of transducers or the successive locations in the scan of a translational SET, via a spatial Fourier transform. It is shown in the following detailed description that the transformed data provides samples of the spatial Fourier transform of the object's reflectivity function. Coverage from a translational SET is not polar though its locus is a circle whose radius is twice the wavenumber of the impinging wave. This constitutes a radiation pattern anomaly which is compensated by the reconstruction process provided by the invention.

After the Fourier transforms, the data is interpolated in the spatial frequency domain (wave number domain) to obtain data in a relationship suitable for inverse discrete Fourier transform. Here the reconstruction of the spatial frequency data is employed which compensates for the distortion due to the radiation patterns at the detector(s). The data then undergoes an inverse discrete Fourier transform to obtain data which represents coordinates which can be plotted to form an image of the object.

In particular, the reconstruction takes into consideration spherical wave fronts which are believed actually to make up the reflected radiation pattern, whereas in prior art systems the mathematical treatment assumed planar front. The invention provides the coordinates of the object in the area of interest more accurately and clearly represents that object, especially when synthetic apertures are used.

As in the prior art, the invention is applicable to many forms of echo imaging, as where the radiation is reflected radiation from a pulse radiation pattern directed toward the object to be imaged. The pulse radiation may be amplitude or frequency modulated. In general, there is usually a time gap after a pulse is emitted which allows for receipt of reflected radiation without interference by radiation which is simultaneously emitted. The radiation may be any radiation which is suitable for image analysis. Usually in the case of echo imaging, the radiation is acoustic, ultrasonic or microwave radiation. The acoustic radiation usually has a frequency of from 5 to 500 hertz or in the case of sonar from about 5 kilohertz to 20 kilohertz. Ultrasonic radiation used for imaging usually ranges from 1 megahertz to 25 megahertz. Microwave radiation used in accordance with the invention usually ranges from 1 gigahertz to 25 gigahertz. In the case of sonic radiation, the source may be a tuned electronic circuit which develops a current having the desired frequency which is then converted to physical sound waves, often by vibrations employing a magnet or piezoelectric device. In the case of ultrasonic radiation, the source is usually an ultrasonic transducer which employs a piezoelectric response to a current at the desired frequency. In the case of microwave energy, the radiation source is usually a microwave generator (e.g. a magnetron) with an associated antenna. In acoustic systems, the detector usually comprises a microphone or transducer, whereas, in ultrasonic systems the detector usually comprises a piezoelectric transducer. In microwave systems, the detector may comprise a tuned electronic circuit which may include transistors, diodes, crystals, microwave tubes or a combination thereof often is conjunction with a receiving antenna.

In a synthetic array system with a translational detector the transducer is usually movable to provide the detector locations $u_1$ to $u_n$. The source and detector may be moved together and may comprise the same device (a transducer). The detector may be moved by any suitable means which is usually mechanical in nature. Such detector may, for example, be moved at a constant speed by means of a constant speed motor or incrementally by means of a stepping motor.

Data from the detector (echo signals) in accordance with the invention is preferably processed using a computer and appropriate computer program. A computer program in Fortran code is set out in Appendix A to this disclosure. The structure and format of the program is shown in FIG. 3. The FFT 1D and FET 2D programs referred to in the calls are publicly available.

The analyzed data may be plotted on any suitable device for usual display including but not limited to a cathode ray tube (CRT), liquid crystal display (LCD), a printer or a mechanical plotter.

The invention is applicable for use in passive imaging systems as where radiation is emitted by the object or echo imaging where pulse radiation is directed from sources usually at known position(s), toward the object and an echo of such radiation is detected at a known location, relative to other detection points, as above described.

The detectors may be in physical arrays using a plurality of detectors at spaced locations ($u_1-u_n$) which are usually close to one another, or as noted above in a $u_1-u_n$ lower and synthesized arrays where a single detector is moved to the various locations ($u_1$ to $u_n$) to receive radiation to create the effect of a physical array using a plurality of elements.

The implementation of the invention which is described in detail below considers various radiation patterns of a synthesized array into a framework appropriate for a computationally-manageable error-free inversion that is based on an accurate system (scattering) modeling of the interaction of the test object and the transmitted spherical (unfocused) radiation source.

In this implementation, inversion methods and signal processing and reconstruction algorithms are illustrated which provide the best mode known for imaging a mobile (translational) SET detector or an array of detectors, whereby phase uncertainties which may exist due to a synchronous data collection in different detector locations are obviated.

In the illustrated implementation of the inventive system a scattering model describing the source/object interaction is presented. The inversion based on this invention incorporates the radiation pattern of each element in an array both in the transmit and receive modes.

Accordingly, a more specific object of this invention is to provide a system which performs synthetic aperture echo imaging using a mobile single element ultrasonic transducer with a dimension that is significantly smaller than a B-scanner's size, thereby enabling a mobile single element transducer (SET), which unlike a B-scanner's array, does not have the capability to produce a focused beam to synthesize the effect of an array with a size equal to the path length that the mobile SET traverses. Such a result permits the smaller SET to reach areas not easily accessible by a B-scanner, e.g., in medical applications for imaging interior of body regions and interior vessels generally.

It is another object of the invention to provide a system for processing target echo regions for a physical detector array or its synthesized counterpart with the same resolution despite the fact that the synthesized array's signal subspace is a subset of the much larger signal subspace for the physical array.

BRIEF DESCRIPTION OF THE DRAWINGS

FIG. 1 shows a depiction of available spatial frequency data in synthetic aperture echo imaging based upon the present invention.

DETAILED DESCRIPTION OF THE INVENTION AND ITS APPLICATION

Figure 2A:
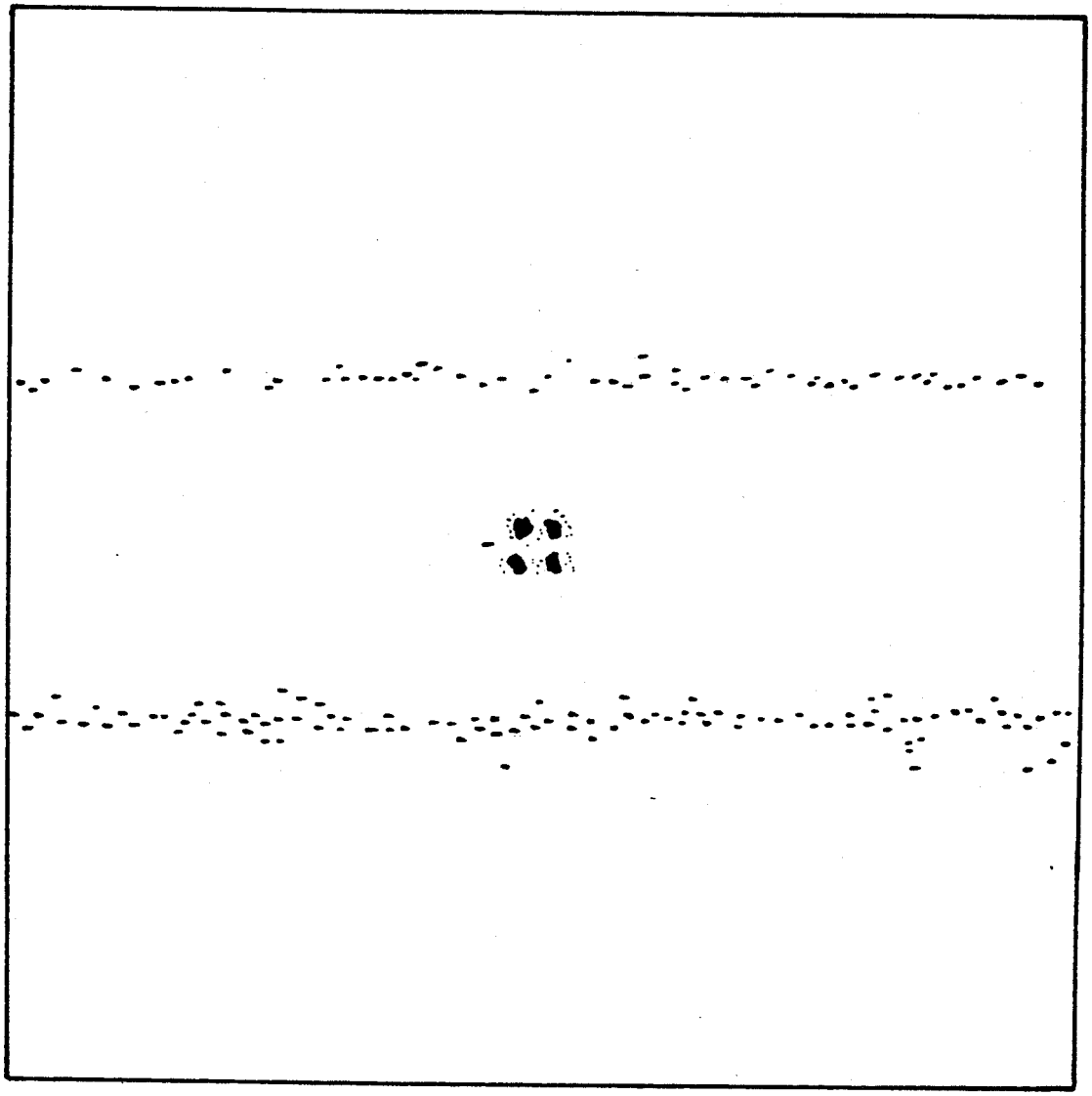
FIG. 2a shows a reconstruction of a test object in synthetic aperture echo imaging utilizing a plane wave approximation based inversion.

Consider a two-dimensional imaging system. We use $(x,y)$ and $(k_x, k_y)$ to identify, respectively, the spatial and the spatial frequency domains. For a spatial domain signal, e.g., $f(x,y)$, its spatial Fourier transform is denoted by $F(k_x, k_y)$. The target or object area illuminated by the transmitted signal resides within a disk of radius $X_o$ centered at the origin in the spatial domain. The x-coordinate is used to identify range (slant-range in three-dimensional geometries), and y specifies the cross-range domain. The surrounding medium (air or water) is homogenous; the speed of propagation in this medium is c. The wavenumber of a wave with temporal frequency $\omega$ travelling in this homogeneous medium is denoted by $k=\omega/c$.

The transmitted signal is multifrequency (e.g., it contains several frequencies) such as a chirp or frequency sweep. For a given coordinate of the aircraft carrying transducer, the target is illuminated by each transducer. The resultant temporal echoed signal is picked up by the transducer (receive-mode) and passed through a coherent detector. The samples of the resultant in-phase and quadrature temporal signals from the detector are obtained via A/D converters. The sampled data on the two channels of the coherent detector are then combined to form a complex temporal signal; the real and imaginary parts of this signal are, respectively, the samples on the in-phase and quadrature channels. Next, temporal discrete Fourier transform of the complex sampled data is computed all in accordance with inventional transducer/sonar signal processing techniques. The invention used the Fourier transformed data at one of the available temporal frequencies of the echo signal, e.g., $\omega$, that is normalized by the amplitude and phase of the echo signal at that temporal frequency.

Suppose the transducer moves along the line $x=X_1$ on the (x,y) plane. The transducer makes a transmission and its corresponding reception at $(X_1, Y_1+u)$ for $u=E$ $[-L,+L]$ (synthesized aperture) on the (x,y) plane; $(X_1, Y_1)$ are known constants. $Y_1$ is the squint-mode cross-range coordinate; $Y_1=0$ which corresponds to the broadside case (transducer along a line to the center of the target area, the other transducers in the array or the single transducer being disposed or movable along a line perpendicular to the line to the center of the target). The radiation pattern is spherical. The round-trip phase delay of the echoed signal by a point scatterer at (x,y) is $2k\sqrt{(X_1-z)^2+(Y_1+u-y)^2}$. Thus, the total recorded echoed signal becomes $$s(u,\omega) = \int\int dxdy\, f(x,y)\exp[j2k\sqrt{(X_1-x)^2+(Y_1+u-y)^2}\,], \quad (2)$$

where $f(xy,y)$ is the object's reflectivity function. Moreover, the spherical wave that appears on the right side of (2) can be decomposed in terms of plane waves $$\exp[j2k\sqrt{(X_1-x)^2+(Y_1+u-y)^2}\,] = \quad (3)$$

$$\int dk_u \left(\frac{1}{\sqrt{4k^2-k_u^2}}\right)\exp[j\sqrt{4k^2-k_u^2}\,(X_1-x) +$$

$$jk_u(Y_1+u-y)].$$

It should be noted that the integral in (3) is in the complex spatial frequency domain. However, the real values of $k_u$, $E[-2k, 2k]$ are used since the measurement system only records the nonevanescent components of the echoed signal. Thus, if the echo signal is corrected using the phase correction function (exp. term) shown in (2), spherical wave propagation both of the transmitted and echo signals is accounted for.

Using (3) in (2), and after some rearrangements, one obtains $$s(u,\omega) = \int \left(\frac{1}{\sqrt{4k^2 - k_u^2}}\right) dk_u \exp[j(\sqrt{4k^2 - k_u^2}\, X_1 + k_u Y_1)] \quad (4)$$

$$[\int\int dx\,dy\, f(x,y)\exp[-j(\sqrt{4k^2 - k_u^2}\, x + k_u y)]]\exp(jk_u u),$$

$$= \int \left(\frac{(2)}{\sqrt{4k^2 - k_u^2}}\right) dk_u \exp[j(\sqrt{4k^2 - k_u^2}\, X_1 + k_u Y_1)] F(\sqrt{4k^2 - k_u^2}, k_u)\exp(jk_u u).$$

The spatial Fourier transform of $s(u, \omega)$ with respect to us is $S(k_u, \omega)$; $k_u$ is the spatial frequency domain for u. Taking the spatial Fourier transform of both sides of (4) with respect to u yields the following inverse equation:

$$F(\sqrt{4k^2 - k_u^2}, k_u) = \quad (5)$$

$$\sqrt{4k^2 - k_u^2}\, \exp[-j(\sqrt{4k^2 - k_u^2}\, X_1 + k_u Y_1)] S(k_x,\omega),$$

or $$F(k_x,k_y) = \sqrt{4k^2 - k_u^2}\, \exp[-j(k_x X_1 + k_y Y_1)] S(k_u,\omega), \quad (5a)$$

where $$k_x = \sqrt{4k^2 - k_u^2} \quad (5b)$$

$$k_y = k_x$$

The inversion in (5) (5a), with (5b) indicates that the Doppler processing across the synthetic aperture (data transformation from u to $k_u$) provides samples of $F(k_x, k_y)$ without any need for the Fresnel approximation used in stripmap-mode SAR.

Figure 2B:
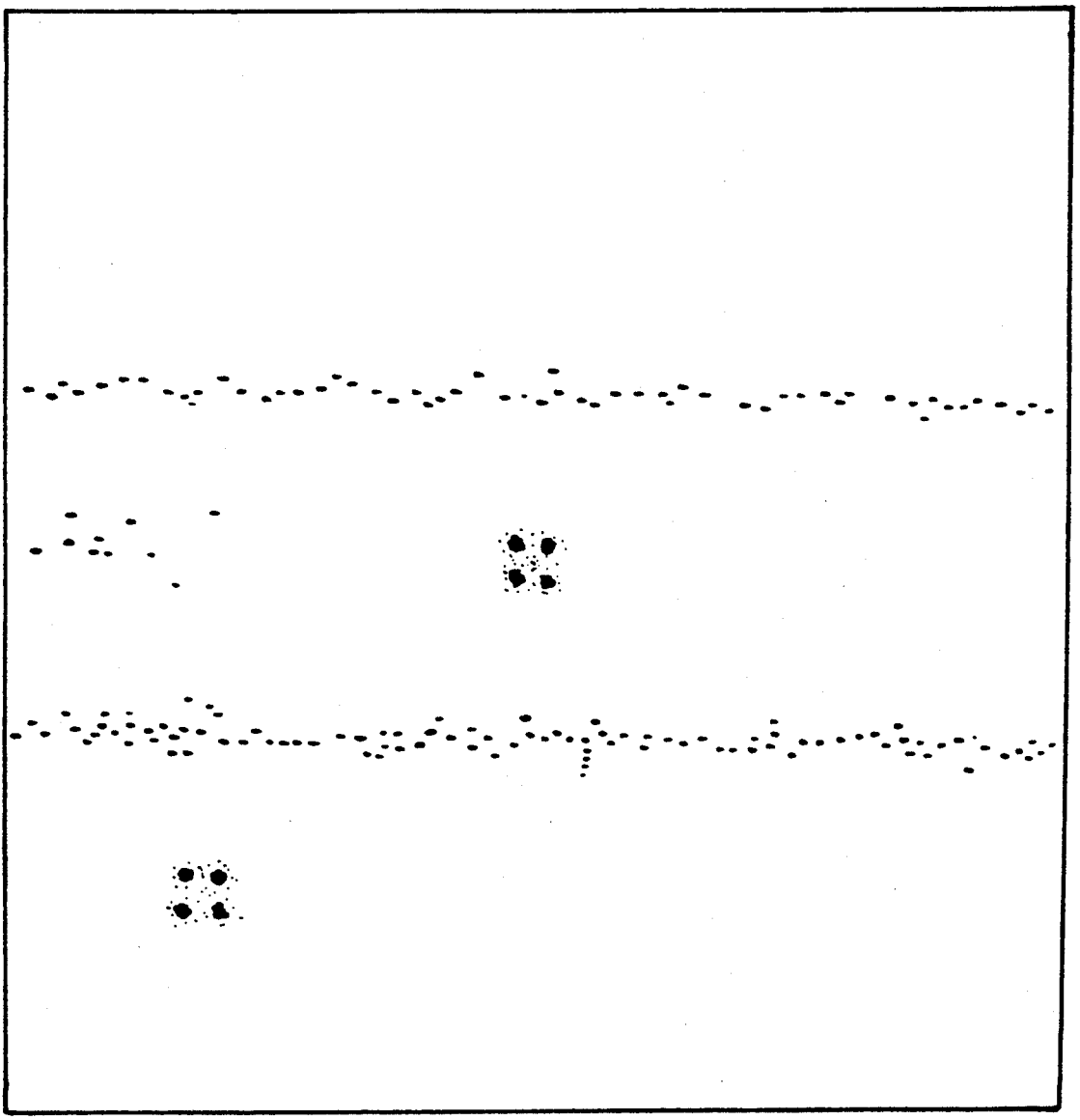
FIG. 2b shows a reconstruction of a test object in synthetic aperture echo imaging utilizing an inversion in accordance with the present invention.

FIGS. 2a and 2b, respectively, show reconstructions of a simulated object using the plane wave approximation-based inversion and the reconstruction using the phase function (discussed above and shown in (2), for a synthetic aperture echo imaging problem. The reconstructed image area is 128 mm × 128 mm. The distance from the center of the image area of the synthesized aperture is R=90 mm (the synthesized array is on the left side of the images in FIG. 2). The synthesized aperture's length is 16 mm (L=8 mm). The wavenumber of the center frequency is 2 mm$^{-1}$. In this case, the resolution at the center of the image, i.e., (90,0), along both the x and y axes is approximately 1.5 mm. An object composed of four point targets located at the vertices of a square with length 4 mm is considered. Four of these objects are positioned at (90,0), (90,−40), (50,−40) and (130,−40). Thus, the test object is composed of sixteen point scatterers; these scatterers are divided into four groups of four; each group is positioned on the vertices of a square. FIG. 2a shows that the incorrect phase (Doppler) processing results in dislocation and smearing of the test object as it moves away from the point (90,0) where the phase error (due to approximating a spherical wave by a plane wave) is zero. FIG. 2b shows the shifting-varying resolution in the reconstructed image. The reconstructed amplitude for a point scatterer is a function of its recovered bandwidth as described previously.

The use of the reconstruction process according to the invention results in spatial frequency coverages which are approximately identical notwithstanding that a physical array and a synthesized array of the same size are used. In fact, it can be shown that for both the physical and synthesized arrays the cross-range resolution in the broadside case is $$\Delta y = \frac{X_i \lambda}{4L} \quad (6)$$

where $\lambda = 2\pi/k$ is the wavelength of the impinging field.

Using the reconstruction process of the invention, physical arrays yield images with cross-range resolutions that are slightly inferior to those of synthesized arrays of the same size. This can be attributed to the fact that the two-dimensional discrete Fourier transforms performed in the (u,v) domain for a physical array produces more numerical errors than the one-dimensional discrete Fourier transform in the u domain for a synthesized array. Clearly, reconstruction from a physical array data is more time consuming that reconstruction using data from a synthesized array of the same length. Note that there are N unique measurements made for a synthesized array while the number of unique data for a physical array is $$\frac{N(N + 1)}{2}. \quad (7)$$

Moreover, the signal subspace of a synthesized array is a subset of the signal subspace for a physical array of the same size.

In accordance with the invention, inversion methods and developing practical reconstruction algorithms for the data base obtained using physical arrays have been refined for radiation and especially echo imaging. Further, the invention enables a synthesized array which (or the equivalent data set from a physical array), in addition to its practical advantages, to exhibit the same performance (resolution) as its physical array counterpart.

Furthermore, a physical array and its synthesized counterpart possess the same resolution despite the fact that the signal subspace spanned by the synthesized array data (N-dimensional for a given temporary frequency; N is the number of element on the array) is a subset of the much larger signal subspace for the physical array data (N(N+1)-dimensional.

In Transmit-mode: a physical array distributes its power among its elements; a synthesized array delivers its entire power into its single element. In Receive-mode: a physical array divides the integration time appropriated for coherent processing among its elements; a synthesized array devotes the entire integration time for coherent processing to its single element. From the foregoing and the fact that both physical and synthesized arrays use a linear processing of the recording data for inversion that yields the same spatial frequency coverage, one may conclude that the signal-to-noise ratios of the reconstructed images for the two array types are identical. It should be noted that the time appropriated for coherent processing, not the size of the data base, is the determining factor in the power of the signal to noise.

The spacing between the elements of a physical array are fixed and cannot be smaller than the size of a single element. While this restriction does not exist for a synthesized array of the present invention.

Stationary B-scanners (physical arrays) are currently used, through esophagus and colon, for chest cavity and pelvic cavity imaging. A B-scanner's resolution, however, is limited by its aperture size. Meanwhile, a large B-scanner penetrating via throat is dangerous, and the depth of penetration in color for a large B-scanner is very limited. A mobile SET with a dimension that is significantly smaller than a b-scanner's size, used in a synthetic array in accordance with the invention, brings flexibility in data acquisition and opens ways for imaging an object that cannot be studied with physical arrays due to constraints imposed by the object's anatomy.

The principles described herein apply equally well to three dimensional imaging where the detector is moved in two dimensions. In such a case, three Fourier transforms are required wherein each of two of the spacial variables are held constant with respect to a third.

Figure 3:
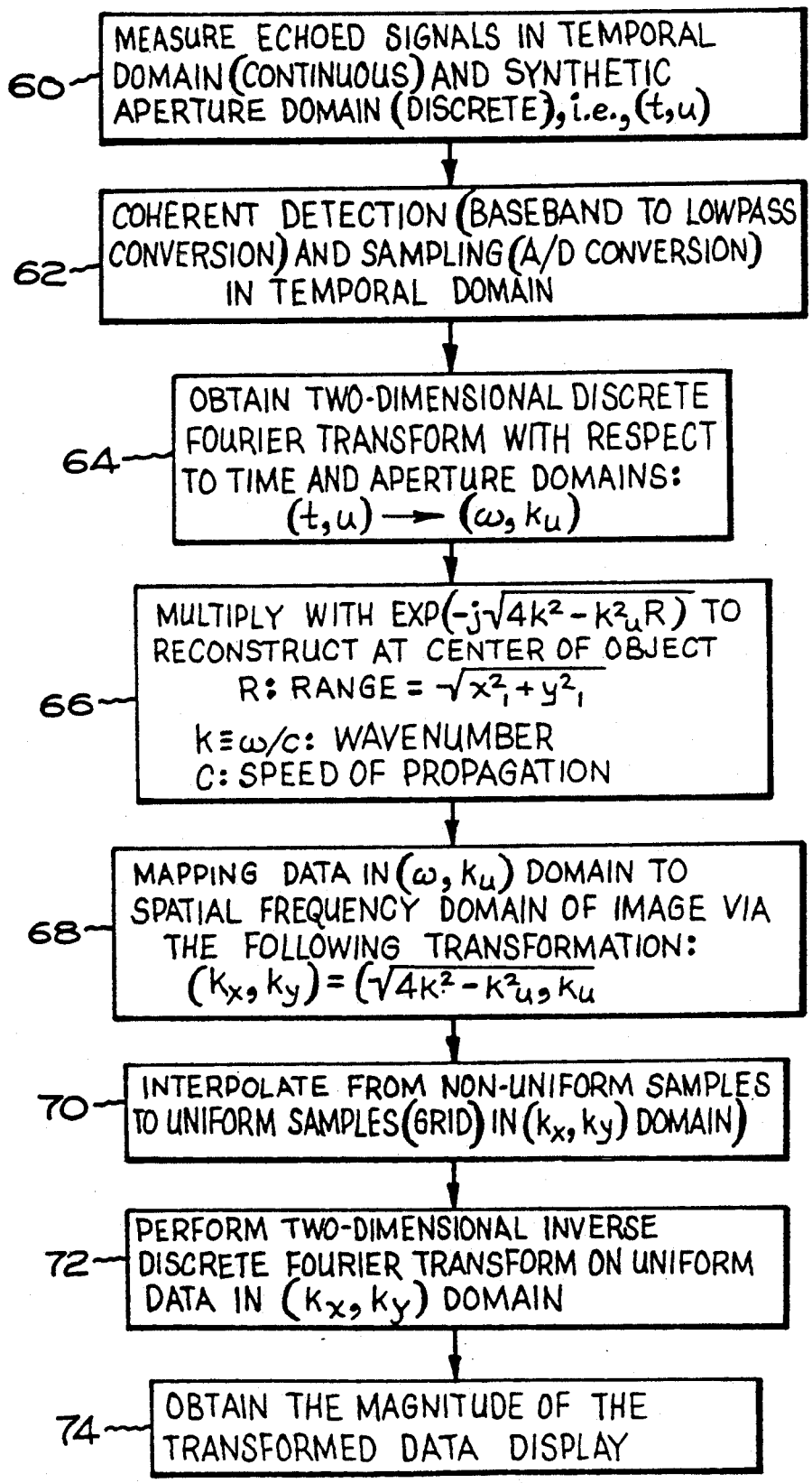
FIG. 3 is a flow chart showing the structure and format of a program used in implementing the invention.

FIG. 3 shows the structure and format of the program. The lines of code in Appendix A which carry out each of the processes shown in FIG. 3 are as follows:

TABLE I

| Process 60 | Conventional Fourier processing omitted from listing. |
|---|---|
| 62 | Conventional Fourier processing omitted from listing. |
| 64 | Conventional Fourier processing omitted from listing. |
| 66 | Lines 115–123 |
| 68 | Lines 115–23 |
| 70 | Lines 132–164 |
| 72 | Lines 167–168 |
| 74 | Lines 170–215 |

The program implements the phase function discussed above. Equation (1) is found on lines 121 and 123. Mapping or assigning to the $K_x$, $K_y$ domain (5b) $K_x = \sqrt{4k^2 - k_u^2}, K_y = k_y$ is found on line 118.

APPENDIX A

```
1           common/blka/u(1024,1024)
2           common s(2048),p(2048)
3           complex u,s,elp,cp,ct,cpp,h0,p,h(20,2048)
4           dimension x(2048),f(2048),y(2048),w(2048),v(2048),b(64,64)
5           dimension ro(20),to(20),fo(20),xx(20),yy(20),zz(20),z(2048)
6           dimension fn(2048)
7           common/wfft/wfftc(10000)
8           character*128 fil
9     50    format(a128)
10          pi=4.*atan(1.)
11          pi2=2.*pi
12          cc=pi/180.
13          mm=3
14          accept *,g0,x0,n,k,ak
15    c
16    c g0: WAVENUMBER (NOT IN RADIANS) AT THE CENTER TEMPORAL FREQUENCY
17    c x0: OBJECT'S RADIAL SUPPORT
18    c n:  SIZE OF THE IMAGE TO BE RECONSTRUCTED
19    c k:  THE NUMBER OF TEMPORAL FREQUENCIES
20    c ak: A PARAMETER AROUND 1.25 THAT DETERMINES THE SPACING OF TEMPORAL FF
21    c
22          n2=n+2
23          nn=n/2+1
24          df=1./(2.*x0)
25          tf=df*float(n)
26          dx=1./tf
27          f0=tf/2.
28    777   continue
29          accept *,d,m,dd,xl,ul,io,il
30    c
31    c d:  PROCESSED (ZERO-PADDED) SYNTHESIZED APERTURE [-d,d]
32    c m:  THE NUMBER OF ELEMENTS ON THE PROCESSED SYNTHESIZED APERTURE
33    c dd: ACTUAL SYNTHESIZED APERTURE [-dd,dd]
34    c xl: TEST OBJECT'S RANGE
35    c ul: TEST OBJECT'S CROSS-RANGE (FOR SQUINT-MODE)
36    c io: THE NUMBER OF POINT OBJECTS
```

```
c i1: i1=0 FOR PROPOSED METHOD, i1=1 FOR PLANE WAVE APPROXIMATION METHOD
c
        iw=0.
        dg=1./(4.*ak*x0)
        dy=(2.*d)/float(m)
        dw=1./(2.*d)
        re=sqrt(x1**2+u1**2)
        te=atan(u1/re)
        hh0=2.*g0*sin(te)
        gg0=2.*g0*cos(te)
        t1=atan((u1-dd)/re)-asin(x0/sqrt(re**2+(u1-dd)**2))
        t2=atan((u1+dd)/re)+asin(x0/sqrt(re**2+(u1+dd)**2))
c
c TYPE (1) REQUIRED NYQUIST SAMPLE SPACING IN THE SYNTHESIZED APERTURE
c      (2) dx: THE SAMPLE SPACING SELECTED FOR THE RECONSTRUCTED IMAGE
c      (3) dy: THE SAMPLE SPACING SELECTED FOR THE SYNTHESIZED APERTURE
c   NOTE: BOTH dx AND dy SHOULD BE LESS THAN (1)
c
        type *,1./(2.*g0*(t2-t1)),dx,dy
c
c
c
c TYPE (4) CROSS-RANGE RESOLUTION
c      (5) RANGE RESOLUTION
c   NOTE: dx SHOULD BE LESS THAN BOTH (4) AND (5)
c
        type *,re/(4.*g0*dd),1./(2.*float(k)*dg)
c
c
c
        f1=float(mm)*df
        do i=1,n
        do j=1,n
        u(i,j)=(0.,0.)
        enddo
        enddo
c
        call fftci(m,wfftc)
c
c SYNTHETIC APERTURE POSITION, y, AND ITS SPATIAL FOURIER TRANSFORM, w
c
        do i=1,m
        y(i)=dy*float(i-1-m/2)
        w(i)=dw*float(i-1-m/2)
        enddo
c
c INPUT THE POINT OBJECTS' PARAMETERS
c
        do i=1,io
        accept *,fo(i),xx(i),yy(i)
        enddo
c
c LOOP FOR EACH TEMPORAL FREQUENCY, LOOP 555
c
        do 555 l=1,k
        type *,l
        g=g0+float(l-k/2-1)*dg
        hh=2.*g*sin(te)
c
c SIMULATION LOOP, EACH j REPRESENTS A GIVEN RADAR POSITION y(j)
c
        do j=1,m
        p(j)=(0.,0.)
            if(abs(y(j)).gt.dd)goto 11
        do i=1,io
        rj=sqrt(xx(i)**2+(yy(i)-y(j))**2)
        h(i,j)=cexp((0.,1.)*pi2*g*rj)/(rj)
        p(j)=p(j)+fo(i)*h(i,j)**2
        enddo
        if(iw.eq.1)p(j)=p(j)*(.54+.46*cos((pi/dd)*y(j)))
        if(i1.eq.0)p(j)=p(j)*cexp((0.,1.)*pi2*hh*y(j))
 11     continue
        enddo
c
```

```
111     c INVERSION/RECONSTRUCTION FROM THE SIMULATED DATA, LOOP 5555
112     c
113           if(il.eq.0)call fft1d(p,-1,m)
114     c
115           do 5555 j=1,m
116           if(il.eq.0)then
117              if(abs(w(j)-hh).ge.2.*g)goto 5555
118           v(j)=sqrt(4.*(g**2)-(w(j)-hh)**2)
119           hi=w(j)-(hh-hh0)
120           gi=v(j)-gg0
121           p(j)=4.*g*pi2*cexp((0.,-1.)*pi2*re*v(j))*p(j)
123           p(j)=cexp((0.,1.)*pi2*u1*(-hh+w(j)))*p(j)
124           else
125           ttt=atan((-y(j)+u1)/re)
126           gi=2.*g*cos(ttt)-gg0
127           hi=-2.*g*sin(ttt)+hh0
128           rre=sqrt(re**2+(u1-y(j))**2)
129           p(j)=4.*g*pi2*cexp((0.,-1.)*pi2*rre*2.*g)*p(j)
130           endif
131     c
132     c INTERPOLATION VIA UFR FOR EACH j, LOOP 9000
133     c
134           FII=(gi/df)+FLOAT(nn)
135           FJJ=(hi/df)+FLOAT(nn)
136           IF=NINT(FII)
137           JF=NINT(FJJ)
138           DO 9000 III=-MM,MM
139           IIF=IF+III
140           IF(IIF.LT.1.OR.IIF.GT.n)GO TO 9000
141           CX=(FLOAT(IIF-nn)*df)
142           DO 9000 JJJ=-MM,MM
143           JJF=JF+JJJ
144           IF(JJF.LT.1.OR.JJF.GT.n)GO TO 9000
145           CY=FLOAT(JJF-nn)*df
146           DIF=SQRT((CX-gi)**2+(CY-hi)**2)
147              if(dif.gt.fl)go to 9000
148              wind=.54+.46*cos((pi/fl)*dif)
149              dif=dif*(x0*.97)*PI2
150              ct=pi2*((.97*x0)**2)*bj(dif)*wind*p(j)
151     c
152     c       d1=abs(cx-gi)
153     c       if(d1.gt.fl)goto 9000
154     c       d2=abs(cy-hi)
155     c       if(d2.gt.fl)goto 9000
156     c       w1=.54+.46*cos((pi*d1)/fl)
157     c       w2=.54+.46*cos((pi*d2)/fl)
158     c       ct=w1*w2*sinc(pi2*.97*x0*d1)*sinc(pi2*.97*x0*d2)*p(j)
159           u(IIF,JJF)=u(IIF,JJF)+ct
160     9000  CONTINUE
161     c
162     5555  continue
163     555   continue
164     c
165     c INVERSE TRANSFORM TO OBTAIN THE IMAGE
166     c
167           call fftci(n,wfftc)
168           call fft2d(1,n)
169     c
170     c DISPLAY THE IMAGE ON THE TERMINAL VIA "grid" ROUTINE
171     c
172           if(n.gt.64)then
173           nc=n/64
174           np=64
175           else
176           nc=1
177           np=n
178           endif
179           do i=1,np
180           do j=1,np
181           b(i,j)=cabs(u(nc*(i-1)+1,nc*(j-1)+1))
182           enddo
183           enddo
```

```
184              call grid(b,np,9)
185     c
186              go to 97
187     c
188     c STORE THE IMAGE DATA FOR DISPLAY VIA LASER PRINTER
189     c
190              if(n.gt.512)then
191              nc=n/512
192              np=512
193              else
194              nc=1
195              np=n
196              endif
197              bmax=0.
198              do i=1,np
199              do j=1,np
200              bbb=cabs(u(nc*(i-1)+1,nc*(j-1)+1))
201              if(bbb.gt.bmax)bmax=bbb
202              enddo
203              enddo
204     c
205              read(5,50)fil
206              open(1,file=fil,status='new')
207              cb=255./bmax
208              do i=1,np
209              do j=1,np
210              ii=nint(cabs(u(nc*(i-1)+1,nc*(j-1)+1))*cb)
211              write(1,51)ii
212              enddo
213              enddo
214     51       format(i3)
215              close(1)
216     c
217     97       continue
218              goto 777
219              stop
220              end
221              SUBROUTINE FFT1D(S,iS,n)
222              COMPLEX S(*),XX(2048)
223              DO 10 I=1,N/2
224     10       XX(I)=S(I)
225              DO 20 I=N/2+1,N
226     20       S(I-N/2)=S(I)
227              DO 30 I=1,N/2
228     30       S(N/2+I)=XX(I)
229              CALL FFT(S,is,n)
230              DO 60 I=1,N/2
231     60       XX(I)=S(I)
232              DO 70 I=N/2+1,N
233     70       S(I-N/2)=S(I)
234              DO 80 I=1,N/2
235     80       S(N/2+I)=XX(I)
236              RETURN
237              END
238     c
239              SUBROUTINE FFT1(S,iS,n)
240              COMPLEX S(*),XX(2048)
241              CALL FFT(S,is,n)
242              DO 60 I=1,N/2
243     60       XX(I)=S(I)
244              DO 70 I=N/2+1,N
245     70       S(I-N/2)=S(I)
246              DO 80 I=1,N/2
247     80       S(N/2+I)=XX(I)
248              RETURN
249              END
250     c
251              SUBROUTINE FFT2D(is,n)
252              COMPLEX A,X(1024)
253              COMMON/BLKA/A(1024,1024)
254              DO 40 J=1,N
255              DO 20 K=1,N
```

```
256   20      X(K)=A(J,K)
257           CALL FFT1D(X,is,n)
258           DO 30 K=1,N
259   30      A(J,K)=X(K)
260   40      CONTINUE
261   C
262           DO 90 K=1,N
263           DO 70 J=1,N
264   70      X(J)=A(J,K)
265           CALL FFT1D(X,is,n)
266           DO 80 J=1,N
267   80      A(J,K)=X(J)
268   90      CONTINUE
269           RETURN
270           END
271   C
272           SUBROUTINE FFT(S,is,n)
273           COMPLEX S(*)
274              common/wfft/wfftc(10000)
275              dimension cpy(5000)
276           IF(iS.LT.0)GO TO 1
277           DO 1000 I=1,N
278   1000    S(I)=CONJG(S(I))
279   1       CONTINUE
280              call f2tcf(n,s,s,wfftc,cpy)
281           IF(iS.LT.0)RETURN
282           DO 2 I=1,N
283   2       S(I)=CONJG(S(I))/N
284           RETURN
285           END
286           SUBROUTINE PLT (F,S,P,IX,IY)
287           REAL F(*),S(*),L(512),P(*),XM,XN
288           XM=F(1)
289           XN=XM
290           DO 1 I=1,IX
291           IF(XN.GT.P(I))XN=P(I)
292           IF(XN.GT.F(I))XN=F(I)
293           IF(XN.GT.S(I))XN=S(I)
294           IF(XM.LT.P(I))XM=P(I)
295           IF(XM.LT.F(I))XM=F(I)
296           IF(XM.LT.S(I))XM=S(I)
297           CONTINUE
298           TYPE *,XM,XN
299           C=FLOAT(IY-1)/(XM-XN)
300           DO 10 I=1,IX
301           DO 2 J=1,IY
302           L(J)=' '
303           T=C*(F(I)-XN)+1.
304           L(NINT(T))='.'
305           IT=NINT(T)
306           T=C*(S(I)-XN)+1.
307           L(NINT(T))='*'
308           IF(IT.LT.NINT(T))IT=NINT(T)
309           T=C*(P(I)-XN)+1.
310           L(NINT(T))='+'
311           IF(IT.LT.NINT(T))IT=NINT(T)
312           TYPE 50,I,(L(J),J=1,IT)
313   )       CONTINUE
314   )       FORMAT(I5,3X,64A1)
315           RETURN
316           END
317
318              subroutine grid(b,n,m)
319              dimension b(64,64)
320              integer l(64)
321              bx=b(1,1)
322              bn=bx
323              do i=1,n
324              do j=1,n
325              if(bx.lt.b(i,j))bx=b(i,j)
326              if(bn.gt.b(i,j))bn=b(i,j)
327              enddo
```

```
328             enddo
329             a=float(m)/(bx-bn)
330             do i=1,n
331             do j=1,n
332             l(j)=nint(a*(b(j,i)-bn))
333             enddo
334             type 55,i,(l(j),j=1,n)
335             enddo
336             type *,bn,bx
337             format(1x,i3,1x,64i1)
338             return
339             end
340 c
341             complex function h0(x)
342             h0=cmplx(bsj0(x),bsy0(x))
343             return
344             end
345
346             REAL FUNCTION BJ(R)
347             BJ=.5
348             IF(R.EQ.0.)RETURN
349             BJ=bsj1(r)/R
350             RETURN
351             END
352
353             REAL FUNCTION SINC(R)
354             SINC=1.
355             IF(R.EQ.0.)RETURN
356             SINC=SIN(R)/R
357             RETURN
358             END
```

We claim:

1. In a system for providing images derive from echo signals from a target in a region illuminated by multifrequency radiant energy, wherein the signals are transformed into data by two-dimensional (time (t) and position (u)) Fourier transformation into frequency domain ($\omega$) data and the spatial frequency domain ($k_u$) data and then is inversely transformed into data from which images can be produced, the improvement comprising means utilizing phase of the signals in the form of a phase function to account for the receipt of said echo signals in the form of spherical wavefronts and reconstructing said frequency domain and spatial frequency domain data in response to said phase function, and means for operating upon said reconstructed data to provide inverse transforms containing said data from which images can be produced with high resolution.

2. The improvement according to claim 1 wherein said signals are synthetic aperture data signals from transducer means at spatial locations $u_1$ to $u_n$ and which are disposed at different distances $y_i$ along a first line perpendicular to a second line to the center of the target, and said reconstructing means includes means for translating said frequency and spatial frequency domain data into corresponding two-dimensional Fourier transform data in accordance with a phase function $$\exp[j2k \sqrt{(X_1 - x)^2 + (Y_1 + u_i - y)^2}\,]$$

where $k=w/c$ is the wavenumber, c is the velocity of propagation in the medium surrounding the target, $(X_1, Y_1+u_i)$, $i=1, \ldots N$ are the coordinates of the i-th transmitting/receiving element (the transducers); $u_i$ takes on values in a vertical line in the y direction along which the element is disposed at position $u_i$, $i=1, \ldots N$ (synthesized aperture); $(X_1, Y_1)$ are the coordinates of the element at the center of the synthetic array (mid-point on the vertical line); the target is centered around the origin; i.e., (0,0); $\sqrt{(X_1-x)^2+(Y_1+u_i-y)^2}$ is the distance from a reflector at the coordinates (x,y) in the target region to the element located at $(X_1, Y_1+u_i)$.

3. In a system for providing images derived from echo signals from a target illuminated by multifrequency radiant energy, wherein the signals are transformed into data by two-dimensional (time (t) and position (u)) Fourier transformation into frequency domain ($\omega$) data and the spatial frequency domain ($k_u$) data and then is inversely transformed into data from which images can be produced, the improvement comprising reconstructing means for translating said frequency and spatial frequency domain data into corresponding two-dimensional Fourier transform data in accordance with a phase function $$\exp[j2k \sqrt{(X_1 - x)^2 + (Y_1 + u_i - y)^2}\,]$$

where said signals are synthetic aperture data signals from transducer means at spatial location $u_1$ to $u_n$ and which are disposed at different distances $y_i$ along a first line perpendicular to a second line to the center of the target; $k=w/c$ is the wavenumber, c is the velocity of propagation in the medium surrounding the target, $(X_i, Y_1+u_i)$, $i=1, \ldots N$ are the coordinates of the i-th transmitting/receiving element (the transducers); $u_i$ takes on values in a vertical line in the y direction along which the element is disposed at position $u_i$, $i=1, \ldots N$ (synthesized aperture); $(X_1, Y_1)$ are the coordinates of the element at the center of the synthetic array (mid-point on the vertical line); the target is center around the origin; i.e., (0,0); $\sqrt{(X_1-x)^2+(Y_1+u_i-y)^2}$ is the dis- from the reflector at the coordinates (x,y) in the target region to the element located at $(X_1, Y_1+u_i)$; and, wherein means are provided for mapping of said two-dimensional Fourier transform data into corresponding two-dimensional ($K_x$ and $K_y$) data which is operated upon by means to provide inverse transforms from which images can be produced, where $K_x = \sqrt{K^2 - k_u^2}$ and $K_y = k_u$ and $k_u$ is the spatial frequency domain data for each frequency of the multifrequency energy.

4. The improvement according to claim 1 wherein said reconstructing means includes means for translating said echo signals into said frequency and spatial frequency domain data so that said data corresponds directly to the said spherical wavefronts without Fresnel or plane wave approximations.

5. The improvement according to claim 4 wherein said signals are received at different locations in an x, y plane spaced from the target and said translating means includes means operative to account for said illuminating energy propagating in the form of said spherical wavefronts by processing each frequency of said signals in accordance with a phase function $$\exp[j2k \sqrt{(X_1 - x)^2 + (Y_1 + u_i - y)^2}\,]$$

where $k=\delta/c$, $\delta$ being each frequency of said signal in radians per second, and c is the velocity of propagation of said signals in the medium surrounding the target, x and y are locations in the plane, $X_1$ and $Y_1$, and $U_1$, are coordinates of said locations, $X_1$ and $Y_1$, being reference coordinates.

* * * * *